United States Patent
Upp et al.

(10) Patent No.: US 9,398,452 B1
(45) Date of Patent: Jul. 19, 2016

(54) BOOTSTRAPPING SECURE CONNECTIONS FOR DEPLOYABLE NETWORKS

(71) Applicant: MOTOROLA SOLUTIONS, INC., Schaumburg, IL (US)

(72) Inventors: Steven D. Upp, Bartlett, IL (US); Anthony R. Metke, Naperville, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 0 days.

(21) Appl. No.: 14/695,239

(22) Filed: Apr. 24, 2015

(51) Int. Cl.
  *H04M 1/66* (2006.01)
  *H04M 1/68* (2006.01)
  *H04M 3/16* (2006.01)
  *H04W 12/04* (2009.01)
  *H04W 12/06* (2009.01)

(52) U.S. Cl.
  CPC .............. *H04W 12/04* (2013.01); *H04W 12/06* (2013.01)

(58) Field of Classification Search
  CPC ............................... H04W 42/04; H04W 12/06
  See application file for complete search history.

(56) References Cited

U.S. PATENT DOCUMENTS

| 7,284,042 B2 * | 10/2007 | Beadles | H04L 29/06 709/201 |
| 2008/0313450 A1 * | 12/2008 | Rosenberg | G06F 9/4416 713/2 |
| 2013/0157673 A1 * | 6/2013 | Brusilovsky | H04W 8/205 455/450 |
| 2014/0315535 A1 | 10/2014 | Bajko | |

FOREIGN PATENT DOCUMENTS

EP 1699166 A1 9/2006

* cited by examiner

*Primary Examiner* — Kashif Siddiqui
(74) *Attorney, Agent, or Firm* — Michael Best & Friedrich LLP

(57) ABSTRACT

A method and apparatus for bootstrapping secure connections between wireless devices and deployable wireless communications networks. Using the method, a wireless device establishes a connection to an auxiliary network, and then establishes a connection with a deployable subscription bootstrapping service. The deployable subscription bootstrapping service generates a temporary subscription profile, including a temporary shared symmetric key, for the wireless device, writes the temporary profile to a deployable home subscriber server, and communicates the temporary profile to the wireless device, which stores the temporary profile. The wireless device then terminates the connection to the auxiliary network, and initiates a connection with the deployable wireless communications network using the temporary subscription profile.

18 Claims, 2 Drawing Sheets

US 9,398,452 B1

BOOTSTRAPPING SECURE CONNECTIONS FOR DEPLOYABLE NETWORKS

BACKGROUND OF THE INVENTION

Increasingly, public safety agencies utilize mobile wireless devices, including, for example, smart phones and tablet computers. The wireless devices operate on wireless data communications networks, using protocols including, for example, long term evolution (LTE), 2G, 3G, 4G, and 5G. These networks and wireless devices can be used by public safety first responders to ensure effective interagency response to emergency or similar incidents. When public safety agencies respond in environments where there is no fixed network service, for example, rural areas, wilderness areas, or areas where catastrophic events have disabled pre-existing networks, deployable wireless communications networks can be used to establish or re-establish secure data networks for public safety use. A deployable wireless communications network can include components of a radio access network (RAN), the enhanced packet core (EPC), and packet data networks (PDNs) that contain applications and services utilized by the wireless devices.

Existing network authentication methods use shared symmetric keys (Ki) and require access to a home subscriber server (HSS) for authentication. The wireless devices store their shared symmetric keys on a physically secured universal integrated circuit card (UICC). The shared symmetric key is also stored at, and is associated with, a home subscriber server. At an incident scene or remote location where there is no fixed network service, there are few, if any, options for connecting visiting wireless devices with their corresponding home subscriber servers. In order to provide remotely operable wireless data communications networks, the deployable wireless data communications networks have their own local home subscriber servers. In order to support isolated, securely-authenticated service operation, sensitive security information for each wireless device (e.g., a shared symmetric key) from multiple remote home subscriber server databases, must be replicated on the local home subscriber server. In some cases, it may not be possible to acquire this data, and duplicating the data poses security risks. Therefore, existing authentication methods are not practical where users from multiple agencies require their wireless devices to access the same deployable wireless data communications network.

Accordingly, there is a need for bootstrapping secure connections for deployable networks.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
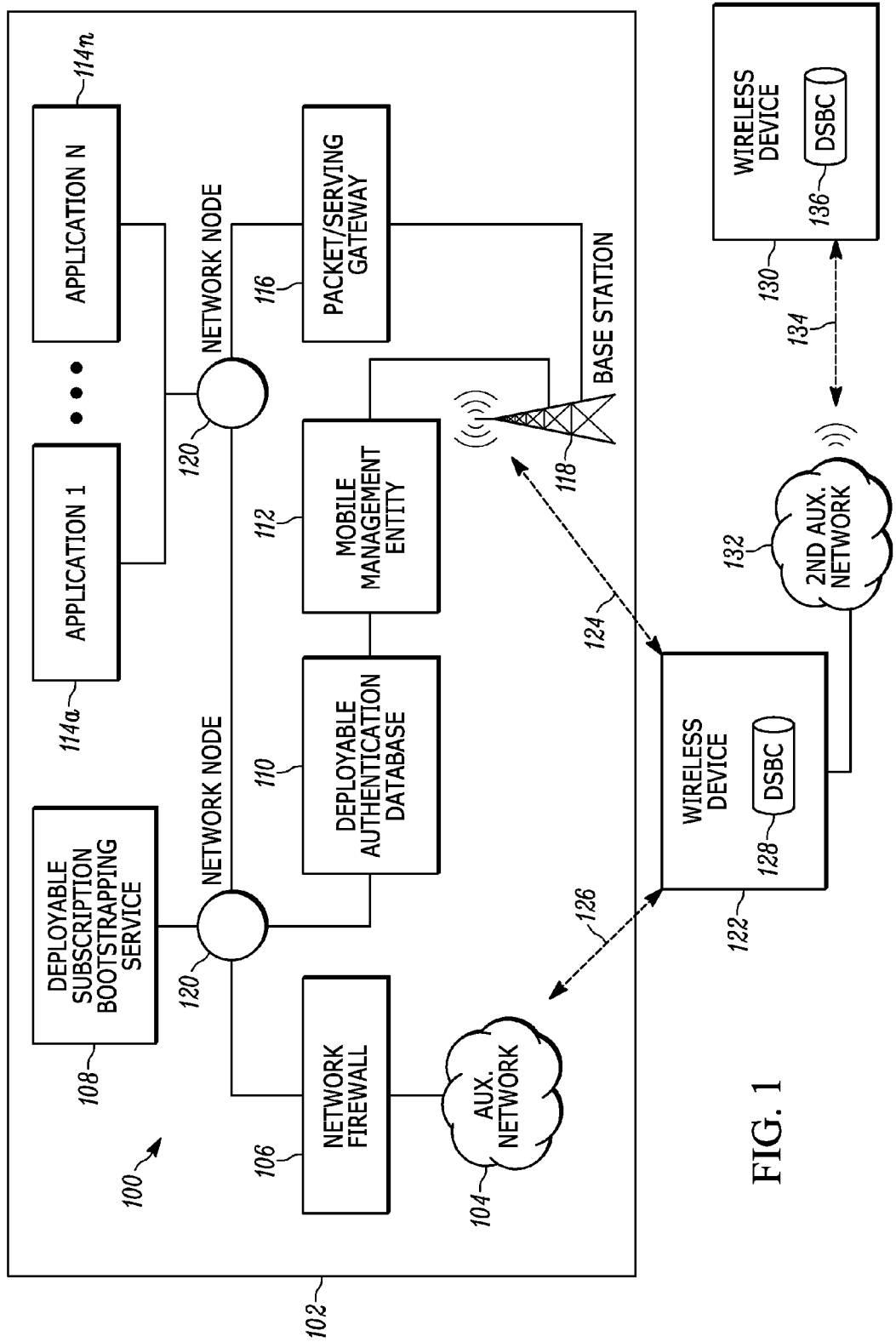
FIG. 1 is a block diagram of a deployable wireless communications network in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Some exemplary embodiments of the invention include a method for connecting a wireless device to a deployable wireless communications network that includes a deployable authentication database. In one embodiment, the method includes the wireless device establishing a connection to an auxiliary network, which is configured to allow the wireless device to access only a deployable subscription bootstrapping service. In some embodiments, the method includes the wireless device and the deployable subscription bootstrapping service determining a temporary shared symmetric key, and the deployable subscription bootstrapping service generating a temporary shared subscription profile including the temporary shared symmetric key. In some embodiments, the method may further include the deployable subscription bootstrapping service communicating the temporary subscription profile to the wireless device via the auxiliary network. The method further includes the wireless device terminating the connection to the auxiliary network, and establishing a wireless connection to the deployable wireless communications network using the subscription profile.

FIG. 1 illustrates an exemplary deployable wireless communications network 100, which operates according to the long term evolution (LTE) specification. In other embodiments, the deployable wireless communications network 100 operates using other specifications or protocols. Components of the deployable wireless communications network 100 are, in one embodiment configured to be mounted on a vehicle 102 (illustrated schematically), or some other means for transporting and deploying the deployable wireless communications network 100 where it is needed. The deployable wireless communications network 100 includes an auxiliary network 104, a network firewall 106, a deployable subscription bootstrapping service 108, and a deployable authentication database 110. As discussed below, the deployable authentication database 110 may be implemented more particularly as a home subscriber server. The deployable wireless communications network 100 also includes a mobile management entity 112, one or more applications 114a, 114n, a packet/serving gateway 116, and a base station 118. The components of the deployable wireless communications network 100 may be connected by network nodes 120. The base station 118 and the auxiliary network 104 may communicate with one or more wireless devices 122. In some embodiments, components of the deployable wireless communications network 100, for example, auxiliary network 104 and base station 118 may be removable from the vehicle 102.

In some embodiments, the deployable subscription bootstrapping service 108 includes, among other things, a processor (e.g., a microprocessor or another suitable programmable device), a memory (i.e., a computer-readable storage medium), and an input/output interface. (not shown) The processor, the memory, and the input/output interface, as well as the other various modules are connected by one or more control or data buses. The use of control and data buses for the interconnection between and communication among the various modules and components would be known to a person skilled in the art in view of the invention described herein.

The memory may include a program storage area and a data storage area. The processor is connected to the memory and executes computer readable code ("software") stored in a random access memory (RAM) of the memory (e.g., during execution), a read only memory (ROM) of the memory (e.g., on a generally permanent basis), or another non-transitory computer readable medium. Software included for the processes and methods for the deployable subscription bootstrapping service 108 can be stored in the memory. The software may include firmware, one or more applications, program data, filters, rules, one or more program modules, and/or other executable instructions. The processor is configured to retrieve from the memory and execute, among other things, instructions related to the processes and methods described herein.

Each wireless device 122 may be, for example, a smart phone, tablet, personal digital assistant (PDA), or other device that includes or can be connected to a network modem or components to enable wireless network communications (such as a baseband processor, memory, amplifier, antenna, etc.). Each wireless device 122 includes software stored therein for execution by the processor, and a non-volatile memory or other memory location for storing a subscription profile (i.e., authentication data and network profile data). The non-volatile memory may be located on a universal integrated circuit card (UICC) in the wireless device 122. In some embodiments, the wireless device 122 includes a wired communications module (e.g., Ethernet or USB), via which the processor is operable to communicate. Each wireless device 122 is designed to communicate wirelessly with the base station 118 over a wireless communication link 124. Each wireless device 122 may also communicate wirelessly or otherwise with the auxiliary network 104 over an auxiliary communication link 126.

Each wireless device 122 also includes a deployable subscription bootstrapping client (DSBC) 128. The deployable subscription bootstrapping client 128 is capable of communicating and exchanging information with the deployable subscription bootstrapping service 108. In some embodiments, the deployable subscription bootstrapping client 128 communicates over the wireless communication link 124, and through the base station 118, the packet/serving gateway 116 and network nodes 120 to the deployable subscription bootstrapping service 108. In other embodiments, the deployable subscription bootstrapping client 128 communicates over the auxiliary communication link 126, and through auxiliary network 104, the network firewall 106, and network node 120 to the deployable subscription bootstrapping service 108. As would be known to one skilled in the art, other communication paths between the deployable subscription bootstrapping client 128 and the deployable subscription bootstrapping service 108 are possible. In some embodiments, the deployable subscription bootstrapping client 128 is a software application (an "app") stored in the memory of wireless device 122, and executed on the processor of the wireless device 122. In other embodiments, the deployable subscription bootstrapping client 128 is built into the operating system of the wireless device 122. The deployable subscription bootstrapping client 128 interacts with and controls aspects of the operating system and the network stack of the wireless device 122 to facilitate connection of the wireless device 122 to either the auxiliary network 104 or the deployable wireless communications network 100. The deployable subscription bootstrapping client 128 is capable of accessing and modifying data on the non-volatile memory of the wireless device 122 to, among other things, store and retrieve a subscription profile.

The subscription profile includes credentials, parameters, and settings that the wireless device 122 uses to establish a connection with the deployable wireless communications network 100 and the services provided by the applications 114*a*, 114*n*. For example, the subscription profile may include a shared symmetric key unique to the wireless device 122 and the deployable wireless communications network 100, a public land mobile network identification (PLMN) ID, an access point name (APN), an international subscriber module identity (IMSI), a shared symmetric key, and operator authentication keys (OPc). The subscriber profile may also include temporary user certificates or temporary identity tokens that allow the wireless device 122 to access the services provided by the applications 114*a*, 114*n*.

The auxiliary network 104 may be a wireless or wired network. In some cases, the auxiliary network 104 may be a wide-area network that conforms to the LTE specification. In other cases, a local-area network is implemented in accordance with a Wi-Fi, Bluetooth, or other near-field communication specification or protocol. Wired connections may be implemented using, for example, an Ethernet or universal serial bus (USB) connection. The auxiliary network 104 allows wireless devices 122 to establish a temporary, isolated connection to portions of the deployable wireless communications network 100. As noted herein, the deployable subscription bootstrapping client 128 can utilize this temporary connection to register with the deployable wireless communications network 100 and to send and receive security credentials and subscription information.

In the illustrated embodiment, the network firewall 106 controls (allow, reject, or restrict) data communications between the wireless device 122 and parts of the deployable wireless communications network 100 over the auxiliary network 104. In one embodiment, the network firewall 106 is configured to prevent the wireless device 122 from accessing any part of the deployable wireless communications network 100 other than the deployable subscription bootstrapping service 108 over the auxiliary network 104. The network firewall 106 may be implemented as a stand-alone device, or as part of one of the other components of the deployable wireless communications network 100.

In some embodiments, access to the auxiliary network 104 is physically secured, and no authentication is necessary to establish the auxiliary communication link 126. For example, access to the auxiliary network 104 may be physically secured, for example, by being located within a security perimeter, or within a lockable structure, cabinet, or vehicle. In some embodiments, physical security also includes radio frequency isolation of the auxiliary network 104. In other embodiments, access to the auxiliary network 104 is electronically secured using Wi-Fi protected setup (WPS), passphrase authentication (e.g., Wi-Fi protected access (WPA)), or digital certificate-based authentication (e.g., extensible authentication protocol (EAP)). In some embodiments, the auxiliary network 104 is an open LTE network having a network identifier distinct from the network identifier for the deployable wireless communications network 100. In some embodiments, access to the auxiliary network 104 is both physically and electronically secured.

In the embodiment illustrated in FIG. 1, the deployable authentication database 110 is a deployable home subscriber server (HSS). The database 110 stores subscription profiles and performs authentication functions for the deployable wireless communications network 100.

The deployable subscription bootstrapping service 108 communicates with the database 110 and the deployable subscription bootstrapping client 128 on the wireless device 122. In some embodiments, communication between the deployable subscription bootstrapping service 108 and the deployable subscription bootstrapping client 128 is established without authentication. In other embodiments, communication between the deployable subscription bootstrapping service 108 and the deployable subscription bootstrapping client 128 is authenticated by providing a security credential, for example a digital certificate issued by a trusted certificate authority of the wireless device 122 that is accepted by the deployable subscription bootstrapping service 108. The security credential may also be a passphrase, or an identity token (ID), e.g., a security assertion markup language (SAML) token, or an open authorization token (OAuth token), provided by a trusted authority. In some embodiments, the identity token contains attributes that determine what services or applications (present on the deployable wireless communications network 100) can be accessed by the wireless device 122. The ID token's attributes also provide other information to be included in the subscription profile for the wireless device 122. In other embodiments, the deployable subscription bootstrapping client 128 establishes a security association tunnel (SA tunnel) and communicates with the deployable subscription bootstrapping service 108 over the SA tunnel. In some embodiments, the SA tunnel is established with the deployable subscription bootstrapping service 108. In other embodiments, the SA tunnel is established with a virtual private network server (VPN server) positioned between the auxiliary network 104 and the deployable subscription bootstrapping service 108.

The deployable subscription bootstrapping service 108 is configured to generate a temporary network subscription profile for one or more wireless devices 122. The deployable subscription bootstrapping service 108 communicates as least a portion of the generated subscription profile to the deployable subscription bootstrapping client 128 over the auxiliary network 104, and stores the subscription profile in the database 110. In some embodiments, the deployable subscription bootstrapping client 128 stores the network profile in a non-volatile memory, for example a universal integrated circuit card (UICC). The temporary subscription profile is used by the deployable wireless communications network 100 and the wireless device 122 to establish the wireless communication link 124 between the wireless device 122 and the base station 118.

The shared symmetric key and the subscription profile that includes the shared symmetric key are temporary in nature. In some embodiments, the temporary subscription profile may expire after a predetermined period of time (e.g., 24 or 48 hours), or after the wireless device 122 disconnects from the deployable wireless communications network 100, as set by the operators of the deployable wireless communications network 100. In other embodiments, the user of the wireless device 122 can signal the deployable subscription bootstrapping client 128 to manually disconnect from the deployable wireless communications network 100, which will trigger the expiration of the temporary subscription profile. In other embodiments, the operators of the deployable wireless communications network 100 can terminate the subscription profile for one or more wireless devices 122 manually at any time. In other embodiments, the deployable wireless communications network 100 may require the wireless device to take action to renew or extend its temporary subscription profile by, for example, confirming its use of the deployable wireless communications network 100.

In some embodiments, the deployable subscription bootstrapping service 108 is also removes a subscription profile from the database 110 when the profile expires, upon receiving a command from the administrator of the deployable wireless communications network 100, or upon receiving a command from the deployable subscription bootstrapping client 128. The deployable subscription bootstrapping client 128, in turn, deletes the subscription profile from the wireless device 122 when the subscription profile expires, upon receiving a command from the deployable subscription bootstrapping service 108, or upon receiving a command from the device user to disconnect.

Figure 2:
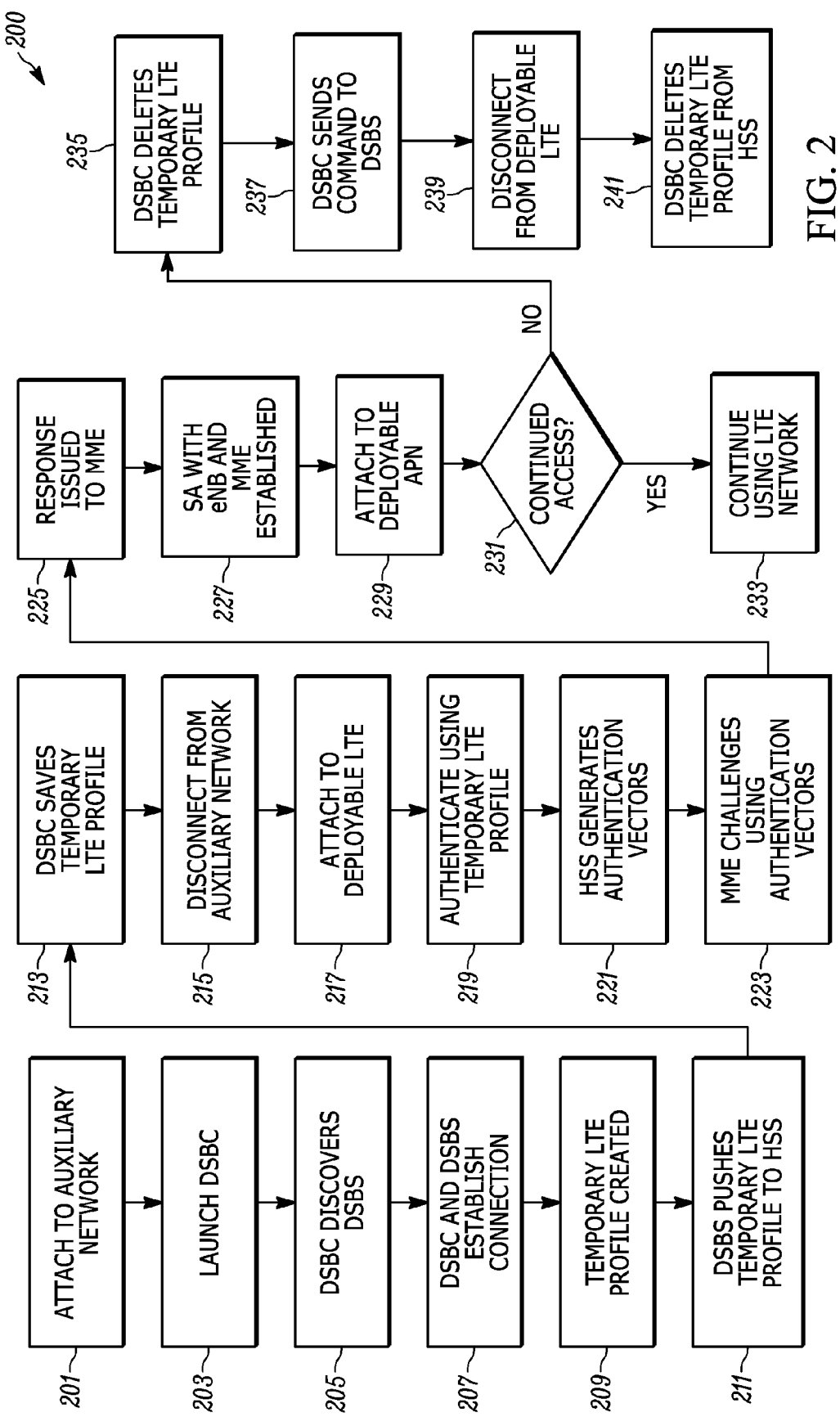
FIG. 2 is a flowchart of a method of bootstrapping secure connections for the deployable wireless communications network of FIG. 1 in accordance with some embodiments.

FIG. 2 illustrates a method 200 for bootstrapping secure connections between a wireless device 122 and a deployable wireless communications network 100. For purposes of description, the embodiment of the deployable wireless communications network 100 used with method 200 is a long term evolution (LTE) network. However, the concepts and techniques embodied in the method described may be implemented with networks using other protocols, for example 2G, 3G, 4G, and future network architectures, which rely on shared symmetric key authentication mechanisms (e.g., 5G). Using method 200, a public safety user is able to connect an LTE wireless device 122, for example a smartphone, to an LTE deployable wireless communications network 100 in a location where the LTE deployable wireless communications network 100 is unable to communicate with the home subscriber server associated with the LTE wireless device 122.

To initiate the connection with the deployable wireless communications network 100, the wireless device 122 establishes a connection over the auxiliary communication link 126 to the auxiliary network 104 in block 201. As noted above, access to the auxiliary network 104 can be unsecured, physically secured, electronically secured, or both physically and electronically secured. The network firewall 106 is configured such that the only communication possible over the auxiliary communication link 126 is between the wireless device 122 and the deployable subscription bootstrapping service 108. Wireless device 122 is not able to communicate with other parts of the deployable wireless communications network 100, or with other devices attached to the auxiliary network 104.

In block 203, the deployable subscription bootstrapping client 128 is launched on the wireless device 122. In some embodiments, the deployable subscription bootstrapping client 128 may establish the auxiliary communication link 126 to the auxiliary network 104 after it is launched.

In block 205, the deployable subscription bootstrapping client 128 discovers the deployable subscription bootstrapping service 108 over the auxiliary network 104 using simple service discovery protocol (SSDP) or another suitable network protocol. After the deployable subscription bootstrapping client 128 has discovered the presence of the deployable subscription bootstrapping service 108, the deployable subscription bootstrapping client 128 establishes a connection with the deployable subscription bootstrapping service 108 in block 207. In some embodiments, this connection is unsecured. In other embodiments, the deployable subscription bootstrapping client 128 establishes an authenticated connection, or connects over a security association (SA) tunnel. In block 209, the deployable subscription bootstrapping service 108 and the deployable subscription bootstrapping client 128 agree on a temporary shared symmetric key, the deployable subscription bootstrapping service 108 creates a temporary shared subscription profile (e.g., an LTE subscription profile) containing the temporary shared symmetric key, and the deployable subscription bootstrapping service 108 communicates the subscription profile to the deployable subscription bootstrapping client 128. The shared symmetric key is unique to the wireless device 122 and the deployable wireless communications network 100. The subscription profile additionally contains the parameters and settings that the wireless device 122 may use to establish a connection with the communications network 100 (e.g., the public land mobile network identification (PLMN) ID, the access point name (APN), and other network parameters. In addition, in block 209, the deployable subscription bootstrapping service 108 automatically provisions services, on the deployable wireless communications network 100, for the newly-created subscription profile. Such services may include internet protocol (IP) multimedia subsystem (IMS), voice over IP (VoIP), push-to-talk, location, presence, or other services.

In embodiments where the connection to the deployable subscription bootstrapping service 108 is authenticated, the deployable subscription bootstrapping service 108 may generate a temporary subscription profile with settings specific to the wireless device 122, based on the attributes of the security credential or ID token provided to the deployable subscription bootstrapping service 108 by the wireless device 122. In embodiments where the connection to the deployable subscription bootstrapping service 108 is unauthenticated, the deployable subscription bootstrapping service 108 may generate a temporary subscription profile with default settings, which may be more limited in duration or scope.

In block 211, the deployable subscription bootstrapping service 108 writes the temporary subscription profile to the deployable authentication database 110. In block 213, the deployable subscription bootstrapping client 128 stores the temporary subscription profile on the wireless device 122 in a non-volatile memory, and configures the settings of the wireless device 122 to enable connection to the network and applications 114a, 114n, as specified in the temporary subscription profile. In block 215, the deployable subscription bootstrapping client 128 causes the wireless device 122 to disconnect from the auxiliary network 104.

In block 217, the deployable subscription bootstrapping client 128 causes the wireless device 122 to establish a wireless connection to the deployable wireless communications network 100. The wireless device 122 initiates authentication with the deployable wireless communications network 100 using the authentication data from the temporary subscription profile stored in block 213. The authentication data includes data used to enable the wireless device to authenticate itself to the mobility management entity 112 of the deployable wireless communications network 100, including the temporary shared symmetric key generated in block 209. In block 221, the deployable authentication database 110 generates authentication vectors for the wireless device 122 using the authentication and key agreement (AKA) algorithm. In block 223, the mobility management entity 112 challenges the wireless device 122 with the vectors. The wireless device 122 runs the AKA algorithm, and returns a response, based on the temporary shared symmetric key, to the mobile management entity 112 in block 225. The wireless device 122 then establishes a security association (SA) with the base station 118 and the mobile management entity 112 in block 227. In block 229, the wireless device 122 attaches to the access point of the deployable wireless communications network 100, and is connected to the packet/serving gateway 116. At this point, the LTE wireless device 122 can use the deployable wireless communications network 100 as it would normally use an LTE network, and access the services provided by the applications 114a, 114n, based on the temporary subscription profile for the wireless device 122. Services, other than access to the LTE network, for example, VoIP, IMS, push to talk, location, and presence, may utilize information provided during the subscription bootstrapping process to enable clients on the wireless device 122 to connect with their respective services within the deployable wireless communications network 100.

As noted above, the subscription profile is temporary. At block 231, the deployable subscription bootstrapping client 128 determines whether the wireless device 122 will continue to access the deployable wireless communications network 100. In block 233, unless it has been determined otherwise, the wireless device 122 maintains the connection and continues to use the deployable wireless communications network 100 as usual. However, if an indication (e.g., the time period expires, the device disconnects, the user issues a command, the deployable subscription bootstrapping client 128 receives a disconnect command from the deployable subscription bootstrapping service 108, and the like) triggers the determination that access is no longer needed, the deployable subscription bootstrapping client 128 will delete the authentication profile and restore the previous network settings for the wireless device 122 in block 235. The deployable subscription bootstrapping client 128 transmits a notification of the deletion to the deployable subscription bootstrapping service 108 in block 237. In block 239, the deployable subscription bootstrapping client 128 causes the wireless device 122 to disconnect from the deployable wireless communications network 100. In block 241, the deployable subscription bootstrapping service 108 deletes the temporary subscription profile for the wireless device 122 from the deployable authentication database 110.

In some embodiments, when a disconnected wireless device 122 needs to reconnect to the deployable wireless communications network 100, it begins the process again at block 201. In other embodiments, the subscription profile is not deleted, and the wireless device 122 reconnects to the deployable wireless communications network 100 beginning with block 217.

In some embodiments, an authenticated wireless device 122 may be allowed to act as a proxy to allow access to the deployable subscription bootstrapping service 108 from a second wireless device 130, which is not in range of the auxiliary network 104. In some embodiments, the deployable subscription bootstrapping client 128 on the authenticated wireless device 122 receives security credentials in its subscription profile that it can use to establish a secure tunnel (e.g., a security association tunnel) to the deployable subscription bootstrapping service 108 over the deployable wireless communications network 100. In some embodiments, the deployable subscription bootstrapping client 128 on the authenticated wireless device 122 may use a communications module in the authenticated wireless device 122 to create an access point for a secondary auxiliary network 132, which is connected to the secure tunnel to extend the auxiliary network 104 via the secondary auxiliary network 132. Similar to firewall 106, the wireless device 122 is configurable to only allow communications between the secondary auxiliary network 132 and the secure tunnel to the deployable subscription bootstrapping service 108. In one exemplary embodiment, an authenticated wireless device may activate its Wi-Fi hotspot to provide a secondary auxiliary network 132. A deployable subscription bootstrapping client 136 on the second, unauthenticated wireless device 130 can then establish a wireless connection 134 to the secondary auxiliary network 132, and then execute the method 200 beginning with block 205 by discovering the deployable subscription bootstrapping service 108.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for connecting a wireless device to a deployable wireless communications network including a deployable authentication database, the method comprising:
    configuring an auxiliary network to allow the wireless device to access a deployable subscription bootstrapping service;
    establishing a connection between the wireless device and the auxiliary network;
    determining, by the wireless device and the deployable subscription bootstrapping service, a temporary shared symmetric key;
    generating, by the deployable subscription bootstrapping service, a temporary subscription profile including the temporary shared symmetric key;
    communicating, by the deployable subscription bootstrapping service, the temporary shared subscription profile to the wireless device via the auxiliary network;
    terminating the connection between the wireless device and the auxiliary network; and
    establishing a wireless connection between the wireless device and the deployable wireless communications network.

2. The method of claim 1, further comprising:
    configuring the auxiliary network to allow the wireless device to access only the deployable subscription bootstrapping service.

3. The method of claim 1, further comprising:
    writing, by the deployable subscription bootstrapping service, the temporary subscription profile to the deployable authentication database; and
    storing, by the wireless device, the temporary subscription profile in a non-volatile memory.

4. The method of claim 3, further comprising:
    receiving, by the wireless device, an indication that the wireless device will no longer access the deployable wireless communications network;
    transmitting to the deployable subscription bootstrapping service, by the wireless device, over the deployable wireless communications network, a notification that the wireless device will delete the temporary subscription profile;

deleting, by the wireless device, the temporary subscription profile;

terminating the connection between the wireless device and the deployable wireless communications network; and deleting, by the deployable subscription bootstrapping service, the temporary subscription profile from the deployable authentication database.

5. The method of claim 1, further comprising:

discovering, by the wireless device via the auxiliary network, the deployable subscription bootstrapping service; and establishing, via the auxiliary network, a connection between the wireless device and the deployable subscription bootstrapping service.

6. The method of claim 5, wherein establishing the connection between the wireless device and the deployable subscription bootstrapping service includes providing, by the wireless device, a security credential.

7. The method of claim 5, wherein establishing the connection between the wireless device and the deployable subscription bootstrapping service includes establishing a security association tunnel.

8. The method of claim 5, wherein establishing the connection between the wireless device and the deployable subscription bootstrapping service includes establishing a security association tunnel between the wireless device and a virtual private network server.

9. The method of claim 1, further comprising:

providing, by the wireless device, an identity token, including a plurality of attributes, to the deployable subscription bootstrapping service, wherein the temporary subscription profile further includes the plurality of attributes.

10. The method of claim 1, further comprising:

establishing, by the wireless device, a security association tunnel with the deployable subscription bootstrapping service via the communications network;

activating, by the wireless device, an access point of a secondary auxiliary network;

establishing a connection between the security association tunnel and the secondary auxiliary network;

configuring the secondary auxiliary network to allow access only to the deployable subscription bootstrapping service via the security association tunnel.

11. A system for connecting a wireless device to a deployable wireless communications network, the system comprising:

an auxiliary network; and a deployable subscription bootstrapping service;

wherein the auxiliary network is configured to allow the wireless device to access the deployable subscription bootstrapping service; and the deployable subscription bootstrapping service
generates a temporary shared subscription profile including a temporary shared symmetric key;
communicates the temporary shared subscription profile to the wireless device via the auxiliary network.

12. The system of claim 11, wherein the auxiliary network is further configured to allow the wireless device to access only the deployable subscription bootstrapping service.

13. The system of claim 11, further comprising a deployable authentication database, wherein the deployable subscription bootstrapping service writes the temporary subscription profile to the deployable authentication database.

14. The system of claim 13, wherein the deployable subscription bootstrapping service deletes the temporary subscription profile upon receiving a notification that the wireless device will no longer access the deployable wireless communications network.

15. The system of claim 11, wherein the deployable wireless communications network includes a long term evolution network.

16. The system of claim 11, wherein the deployable subscription bootstrapping service establishes an authenticated connection with the wireless device.

17. The system of claim 11, wherein the deployable subscription bootstrapping service establishes a security association tunnel with the wireless device.

18. The system of claim 11, further comprising a virtual private network server configured to establish a security association tunnel with the wireless device.

* * * * *